United States Patent [19]

Dobb

[11] 4,067,516

[45] Jan. 10, 1978

[54] AIR CUSHION PONTOON FREIGHT HELICOPTER

[76] Inventor: Herbert Leonard Dobb, 35 Gulfview Drive, Brampton, Ontario, Canada

[21] Appl. No.: 534,855

[22] Filed: Dec. 20, 1974

[30] Foreign Application Priority Data

Mar. 18, 1974 Canada .................................. 195227

[51] Int. Cl.² ............................................ B64C 27/06
[52] U.S. Cl. .............................. 244/17.11; 114/67 A; 180/117; 244/17.17; 244/118 R
[58] Field of Search ...................... 244/17.11, 17.17, 2, 244/100 A, 118 R, 137 R, 17.25; 9/2 A; 114/67 A, 66.5 F; 180/116, 117, 121, 127, 128; 212/18

[56] References Cited
U.S. PATENT DOCUMENTS

| 1,428,066 | 9/1922 | Van Voorst | 244/17.17 X |
| 2,957,648 | 10/1960 | Howard et al. | 244/17.25 |
| 3,102,705 | 9/1963 | Namsick | 114/66.5 F X |
| 3,285,535 | 11/1966 | Crowley | 244/2 |
| 3,662,853 | 5/1972 | Love | 180/116 X |
| 3,812,987 | 5/1974 | Watatani | 212/18 X |

Primary Examiner—Trygve M. Blix
Assistant Examiner—Barry L. Kelmachter
Attorney, Agent, or Firm—J. Richard Cavanagh

[57] ABSTRACT

The specification describes an air suspension freight vehicle comprising a divided pontoon structure in the form of two parallel spaced apart rigidly connected air cushion pontoons adapted to carry freight loads therebetween greater in air cushion transport over ground and water surfaces while utilizing a helicopter attachable to the frame for propulsion and which without cargo may be transported by helicopter to and from a point of utilization.

6 Claims, 6 Drawing Figures

AIR CUSHION PONTOON FREIGHT HELICOPTER

This invention relates to an air suspension freight vehicle comprising a divided air cushion pontoon structure adapted to transport freight loads over terrain surfaces with helicopter propulsion attached thereto.

There have been attempts to provide an air cushion vehicle for the transport of heavy loads over terrain surfaces. Such a vehicle may comprise essentially a large inverted box having fans therein adapted to draw in exterior air and to expel same through sheet rubber vanes or tubes toward terrain surfaces to develope an air cushion, the total force of which is adapted to support the vehicle and the cargo carried thereby above the terrain surface. Such vehicles are drawn by tractors or the like in the north country flat lands or may be pushed by fan propulsion structure. It has been found that attempts to drag only one such air cushion vehicle with a cargo load therein results in a number of difficulties, among which the accurate positioning of the cargo on the vehicle presents a serious problem because the vehicle is so loaded in essentially a top heavy condition and tends to tip. Furthermore, a drawing vehicle or craft such as a tractor cannot control the side lash of the air cushion vehicle when negotiating a turn. Thus numerous conditions of dangerous lack of control of a single air cushion vehicle can occur.

According to the invention the foregoing and other disadvantages of the art are overcome by providing two fixed spaced apart air cushion vehicles each of which is adapted to serve as a buoyant pontoon, each having, or both having in common air cushion pressure generating means and adapted to support in common a helicopter structure having a helicopter rotor adapted to dip forwardly to provide forward propulsion. The thrust of said rotor preferably being greater than the unloaded dead weight of the helicopter and air cushion pontoon structures combined whereby the same may achieve helicopter flight in the no load condition, the said air cushion flight devices and associated air pressure generating means therefor being adapted to support as air cushion vehicles a freight cargo load greater than the no load dead weight of said pontoon structure and helicopter to achieve air suspension of said load thereby to enable the helicopter rotor on forward inclination to effect a controllable forward motion of the said load being positionable to adjust its centre of gravity relative to the combined centre of gravity of said pontoon structure and the effective centre of lift of said helicopter.

Other objects of the invention will be appreciated by a study of the specification taken in conjunction with the drawings. In the drawings.

Figure 1:
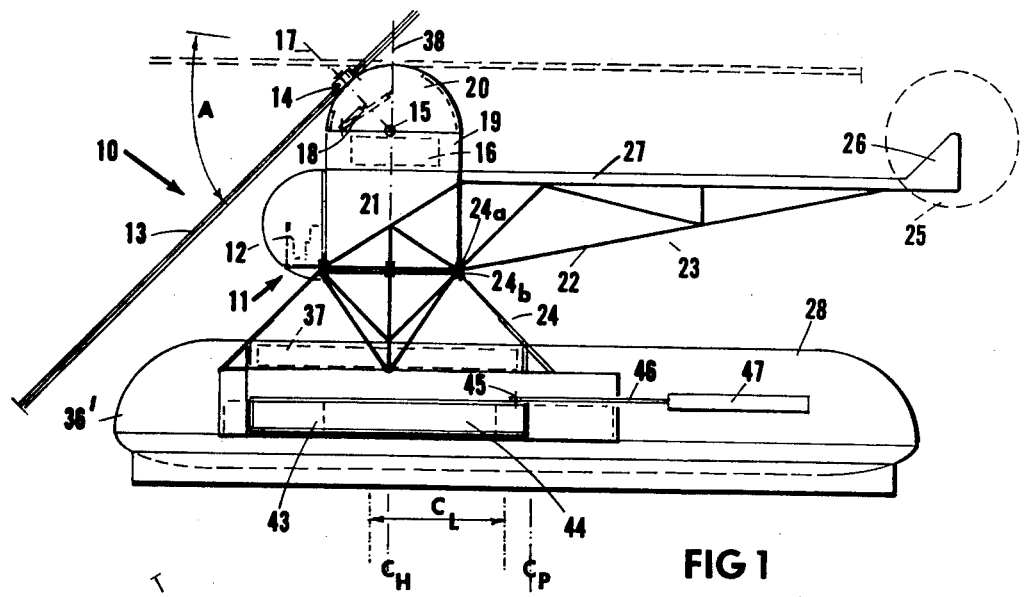
FIG. 1 is a side elevation of an air suspension freight vehicle having a helicopter fastened thereto according to the invention.
Figure 2:
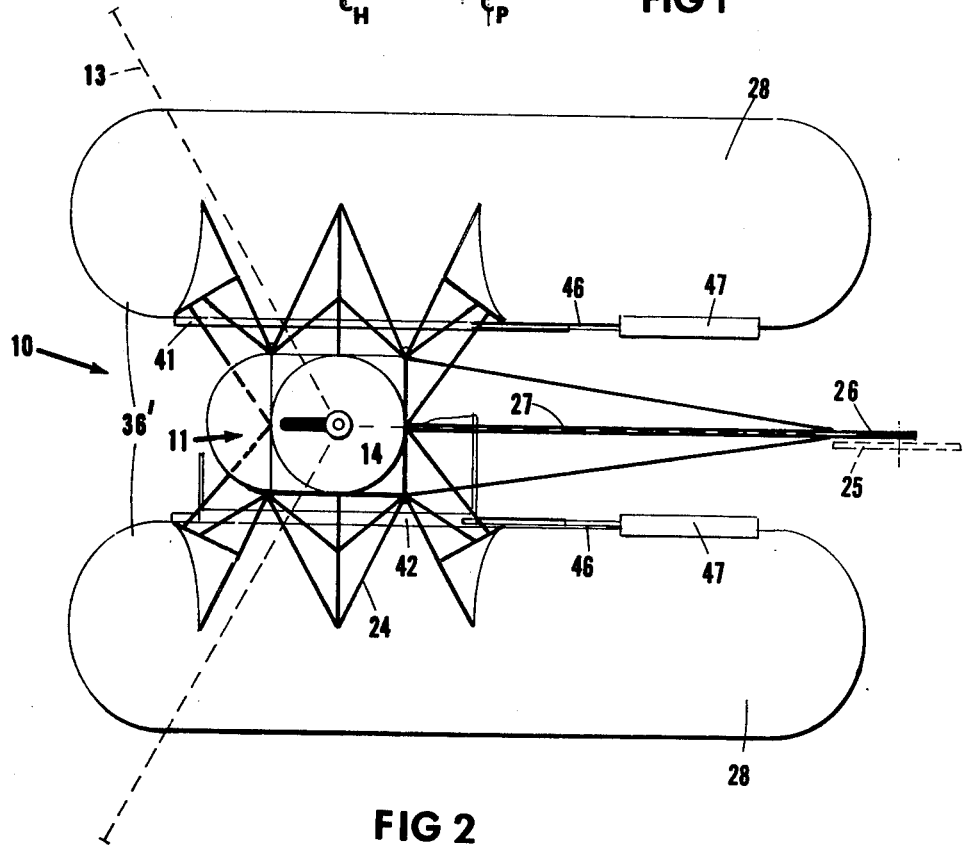
FIG. 2 is a plan view of FIG. 1.

In the drawings the divided pontoon air cushion vehicle 10 of the invention comprises a detachable helicopter 11 having pilot operable controls 12 adapted to control the helicopter rotor 13, the latter preferably being of the three-blade type rotating on rotor shaft 14 driven through universal joint 15 or other means by a suitable helicopter engine 16 of sufficient horsepower to deliver a predetermined maximum thrust "$T_h$" of blades in the direction of the axis 17 of rotor shaft 14. Shaft 14 is adjustable through arcuate gap accommodating same to adjust the angle of inclination "A" by hydraulic cylinder 18 extending between engine enclosure 19 supporting spherical engine hood 20 and the shaft 14 thereby to adjust the value of the angle "A" between minus 5 degrees rearward and at least a maximum of plus 45 degrees forward. Engine enclosure 19 and engine 16 are carried by a cabin structure 21 which is associated with helicopter frame elements or members 22 defining a fuselage frame 23 and pontoon mounting or connecting frames 24. A conventional lateral stabilizer or steering propeller 25 mounted on tail fin 26 is driven by hydraulic or other suitable connection through tubing 27 by engine 16.

Figure 6:
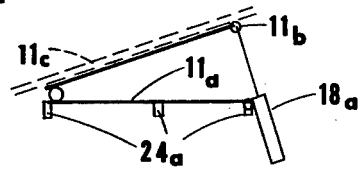
FIG. 6 is a side elevation of an adjustable tilt frame for connecting a commercial helicopter to the freight vehicle of the invention.

While the helicopter structure 11 shown is not recognizable as identical to any well-known presently manufactured type or style its features, structure and mechanism are of well-known design aspect. Preferably the helicopter structure 11 is detachable from rigid pontoon interconnecting from 24 such as by pins 24a at corner connecting fittings 24b. It will also be evident that a conventional helicopter of present commercial type leg be clamped by its skids or other landing gear to connecting fittings 24b. In such event, however, it will be desirable to clamp same to mounting frame 11a of FIG. 6 hinged at its front end at 11b and adapted to be adjustably raised by pressure cylinder 18a to raise frame part 11b to which helicopter skids 11c are clamped (such as by suitable straps 11d or the like) to provide an increased effective dip angle for the helicopter rotor by controllably tipping the helicopter itself forwardly.

Figure 3:
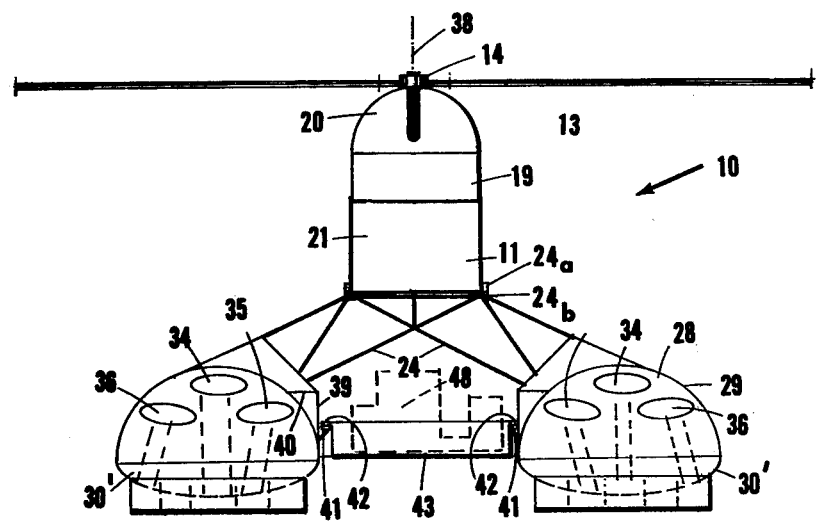
FIG. 3 is a front view of FIG. 1.
Figures 4, 5:
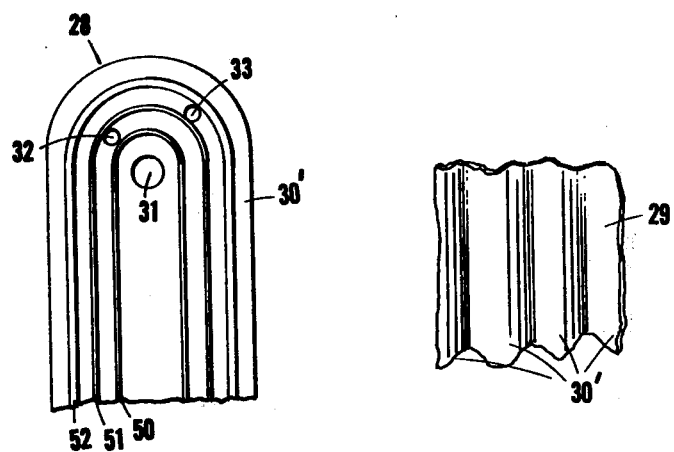
FIG. 4 is an underside view of a pontoon of FIG. 3.
FIG. 5 is a fragment of the skin of one of the pontoons of FIGS. 1 to 3.

The parallel spaced apart pontoons 28 are formed in a drainage conduit sectional shape of combined elliptical section, the upper portion of the section as indicated in FIG. 3, i.e. upper surfaces 29 being of say a 65 degree elliptic shape. The material thereof being sheet metal such as 3/16 inch steel having corrugations 30 in the arcuate direction as indicated in FIG. 5 or otherwise described as transverse corrugations. The bottom wall 30' has central region, intermediate region and outer region openings 31, 32, 33 respectively connecting by one or more flexible air tubes to in-draft independent engine driven fan inductors 34, 35, 36, located within the forward toe portion 36' of each pontoon. A fuel tank 37 is located in each pontoon in such manner that its centre of gravity is located relative to the centre of vertical thrust "$C_v$" of the helicopter rotor when the latter is in the vertical thrust position 38. The inboard surfaces of the pontoons 28 carry longitudinal inverted L-shaped metal stringers welded or otherwise fastened by web 39 and flange 40 to inboard surfaces of the pontoons to rigidify same longitudinally and to support longitudinally and inwardly extending shelf tracks 41 adapted slidably to receive suspension means such as the suspension flanges 42 of the demountable cargo carrier box structure 43. At the stern end 44 of the box structure 43 is provided a means such as a bolt or pin 45 for coupling the extending piston 46 of a double-acting hydraulic or pneumatic cylinder 47 fixed to the pontoon.

In operation, the load box 43 is loaded with machinery or other heavy cargo 48 of a deadweight of a maximum predetermined deadweight "D". The fan engines 34 to 36 are then energized to induct air at a sufficient rate to develop an escaping air pressure from the lower free edges of the conventional elastomer skirt members 51, 52, 53 as to develope a total air cushion vertical thrust under each of said pontoons equal to greater than one-half "D" plus "W" where "W" is the total unloaded weight including fuel of the air freight vehicle 10 of the invention. If the cargo 48 does not have its centre of gravity located precisely between the pontoons 29 then the air inducting fans of one pontoon will be operated at a higher speed to induct more air than those of the other pontoon. Thus lateral centering of the load is effectively carried out by independent pressure control of the pontoons while longitudinal adjust of cargo centre of gravity is mechanically provided for by adjusting cylinders 47.

What is claimed is:

1. An air suspension freight vehicle comprising: a divided pontoon structure defined by two air cushion pontoons in parallel spaced apart relation; frame structure rigidly interconnecting said pontoons to define a cargo gap therebetween; air cushion skirt means on undersurfaces of said pontoons and defining multiple air chambers between said undersurfaces and a terrain surface; independent engine driven air induction fans located in said pontoons to induct air through outer surfaces thereof and to direct inducted air to said chambers thereby to develop lift in each pontoon relative to said surface; a cargo carrier mountable in said gap between said pontoons; guide means slidably supporting said cargo carrier for slidably adjusting the position of the centre of gravity of the cargo relative to the effective centre of gravity of said pontoon structures; means for adjustably positioning said cargo carrier on said guide means; and a helicopter fastened to said frame, said helicopter having a bladed rotor tipable forwardly and downwardly to provide forward propulsion for said vehicle.

2. The vehicle of claim 1 in which the air induction fans are located in frontal regions of said pontoons and directed forwardly to induct exterior air and to reduce air pressure over frontal surfaces of said pontoons.

3. The vehicle of claim 1 and a support frame between said helicopter and said rigid frame, said support frame having a forward lateral hinge connecting upper and lower support frame parts; and means for adjusting the angle between said support frame parts to control the flight attitude angle of the helicopter relative to said pontoon structure.

4. The vehicle of claim 1 in which the vertical thrust of the helicopter rotor blades is greater than the combined deadweight of the helicopter, frame and pontoon structures including accessories, fuel and said cargo carrier without cargo.

5. The vehicle of claim 1 in which the suspension lift developed by said pontoons as a maximum is equal to at least twice the total cargo free deadweight of the helicopter, frame and pontoon structures together.

6. The vehicle of claim 1 in which the air induction fans control the lateral balance of the cargo between the pontoons.

* * * * *